(12) United States Patent
Nakahara

(10) Patent No.: US 8,964,111 B2
(45) Date of Patent: Feb. 24, 2015

(54) ILLUMINATION APPARATUS AND IMAGE PICKUP APPARATUS

(71) Applicant: Canon Kabushiki Kaisha, Tokyo (JP)

(72) Inventor: Seiji Nakahara, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 13/926,576

(22) Filed: Jun. 25, 2013

(65) Prior Publication Data

US 2014/0002724 A1   Jan. 2, 2014

(30) Foreign Application Priority Data

Jun. 29, 2012 (JP) ................... 2012-146653

(51) Int. Cl.
  *H04N 5/225* (2006.01)
  *F21V 13/04* (2006.01)
  *G03B 15/05* (2006.01)

(52) U.S. Cl.
  CPC .............. *H04N 5/2256* (2013.01); *F21V 13/04* (2013.01); *G03B 15/05* (2013.01); *G03B 2215/0585* (2013.01)
  USPC ......................................... 348/371; 348/375

(58) Field of Classification Search
  CPC .................................................. H04N 5/2256
  USPC .................................. 348/370, 371, 373–376
  See application file for complete search history.

(56) References Cited

U.S. PATENT DOCUMENTS

| 2,038,409 | A | * | 4/1936 | Bone | 40/564 |
| 5,491,525 | A | * | 2/1996 | Yamasaki et al. | 353/98 |
| 2004/0032739 | A1 | * | 2/2004 | Johanson | 362/304 |

FOREIGN PATENT DOCUMENTS

| JP | H9-138449 A | 5/1997 |
| JP | 2005-043688 A | 2/2005 |

* cited by examiner

*Primary Examiner* — Tuan Ho
(74) *Attorney, Agent, or Firm* — Carter, DeLuca, Farrell & Schmidt, LLP

(57) ABSTRACT

The illumination apparatus includes a reflector unit to reflect a light flux from a light source. The reflector unit includes a first reflector and a second reflector whose relative positions are changeable to change an illumination angle. At a first illumination angle, the second reflector is disposed inside the first reflector, and the light flux from the light source is reflected by the second reflector to exit from the reflector unit. At a second illumination angle smaller than the first illumination angle, the first reflector is disposed further on a light exit side than the second reflector, and the light flux from the light source is reflected by at least one of the first and second reflectors to exit from the reflector unit. A distance between the light source and the second reflector at the second illumination angle is shorter than that at the first illumination angle.

6 Claims, 4 Drawing Sheets

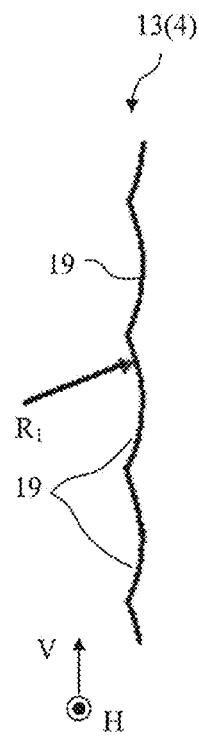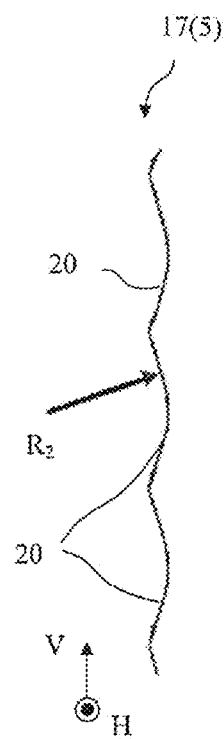
FIG. 4A    FIG. 4B    FIG. 4C
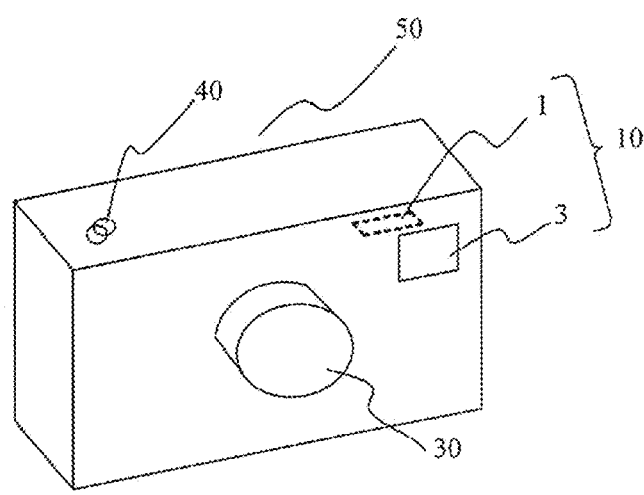
FIG. 5

ILLUMINATION APPARATUS AND IMAGE PICKUP APPARATUS

BACKGROUND OF THE INVENTION

1. Field of the Invention

The present invention relates to an illumination apparatus, and particularly to an illumination apparatus to be used with image pickup apparatuses, such as digital still cameras and video cameras, to illuminate a predetermined area as an auxiliary light source.

2. Description of the Related Art

Electronic flash apparatuses as illumination apparatuses whose illumination angle is changeable with focal length of an image pickup lens. For example, Japanese Patent Laid-Open No. 09-138449 discloses a flash apparatus in which a light source and a movable reflector are integrally moved to change an illumination angle. In this flash apparatus, light proceeding toward outside the movable reflector is reflected by a fixed reflector to prevent loss of light quantity.

Moreover, Japanese Patent Laid-Open No. 2005-043688 discloses a flash apparatus in which a light diffuser provided with concave cylindrical lenses and convex Fresnel lenses is disposed further on an object side than a reflector to compensate for lack of light distribution to a peripheral part of an illumination area.

However, with increase of zoom ratio of image pickup lenses, a flash apparatus having a larger changeable range of the illumination angle is required.

SUMMARY OF THE INVENTION

The present invention provides an illumination apparatus whose illumination angle is changeable in a large range and an image pickup apparatus with the flash apparatus.

The present invention provides as one aspect thereof an illumination apparatus including a light source, and a reflector unit to reflect a light flux from the light source. The reflector unit includes a first reflector and a second reflector whose relative positions on an illumination axis are changeable to change an illumination angle of the illumination apparatus. When the illumination angle is a first illumination angle, the second reflector is disposed inside the first reflector, and the light flux entering the reflector unit from the light source is reflected by the second reflector to exit from the reflector unit. When the illumination angle is a second illumination angle smaller than the first illumination angle, the first reflector is disposed further on a light exit side than the second reflector, and the light flux entering the reflector unit from the light source is reflected by at least one of the first and second reflectors to exit from the reflector unit. A distance on the illumination axis between the light source and the second reflector when the illumination angle is the second illumination angle is shorter than that when the illumination angle is the first illumination angle.

The present invention provides as another aspect thereof an image pickup apparatus including the above-described illumination apparatus, and an image sensor to capture an object illuminated with light from the illumination apparatus.

Further features of the present invention will become apparent from the following description of exemplary embodiments with reference to the attached drawings.

BRIEF DESCRIPTION OF THE DRAWINGS

FIG. 4A shows a sectional shape of a first light diffusing portion in the light source side surface of the first light diffuser.

FIG. 4B shows a sectional shape of a second light diffusing portion in the light source side surface of the second light diffuser.

FIG. 4C shows a sectional shape of a light collecting portion in the opposite-to-light source side surface of the first light diffuser.

FIG. 5 schematically shows an image pickup apparatus provided with the illumination apparatus of the embodiment.

DESCRIPTION OF THE EMBODIMENTS

Figure 1A:
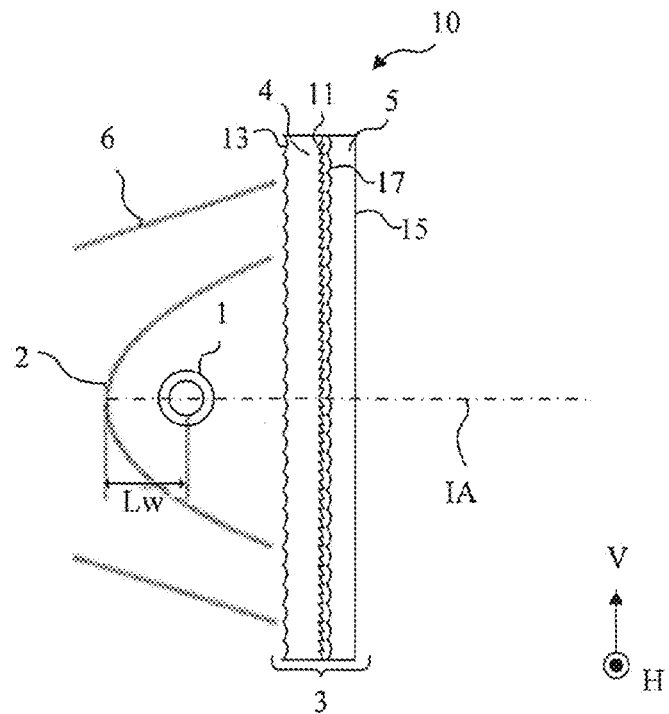
FIGS. 1A and 1B are sectional views of an illumination apparatus that is an embodiment of the present invention at a wide-angle end and at a telephoto end, respectively.

Exemplary embodiments of the present invention will hereinafter be described with reference to the accompanying drawings.

(Image Pickup Apparatus)

An image pickup apparatus 50 shown in FIG. 5 performs image pickup of an object in response to press of a release button 40 by using an image pickup lens 30 and an image sensor 60. When the object is dark or in a backlight state (where the object is darker than its background), the image pickup apparatus 50 causes an electronic flash apparatus 10, which is an illumination apparatus as an embodiment of the present invention, to emit illumination light to illuminate the object therewith. The electronic flash apparatus 10 is hereinafter simply referred to as "a flash". The flash 10 causes, in order to reduce unevenness of the illumination light, light from a light source 1 to pass through a light diffuser unit 3 and then to emit toward the object. The flash 10 is capable of changing its illumination angle, as described below.

(Flash)

Figure 1B:
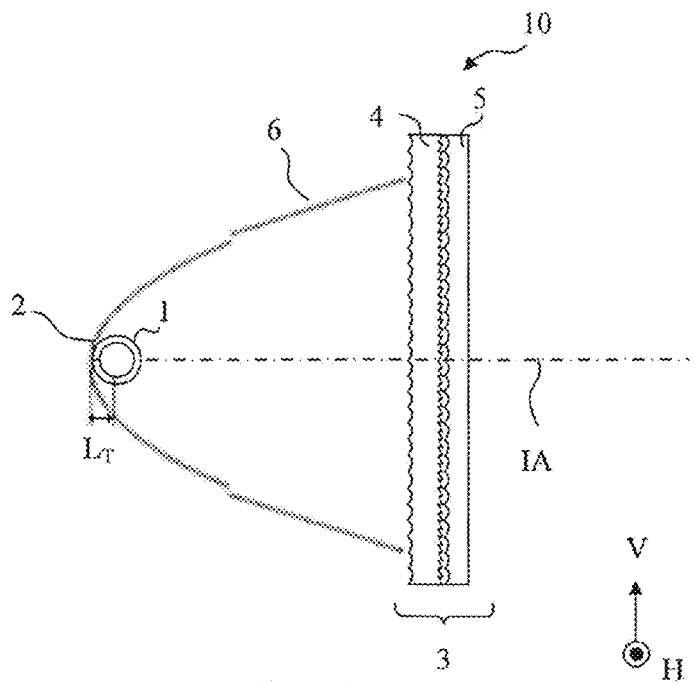

The illumination angle-changeable flash 10 shown in FIGS. 1A and 1B includes the light source 1 that is a line light source extending in a direction orthogonal to a paper face of each of FIGS. 1A and 1B, a first reflector 6 and a second reflector 2 which constitute a reflector unit to reflect the light from the light source 1, and the light diffuser unit 3 to reduce the unevenness of the illumination light.

FIG. 1A shows a sectional view of the flash 1 at its wide-angle end (corresponding to a first illumination angle), and FIG. 1B shows a sectional view of the flash 1 at its telephoto end (corresponding to a second illumination angle). In FIGS. 1A and 1B, reference character V denotes a vertical direction, and reference character H denotes a horizontal direction.

Figure 2A:
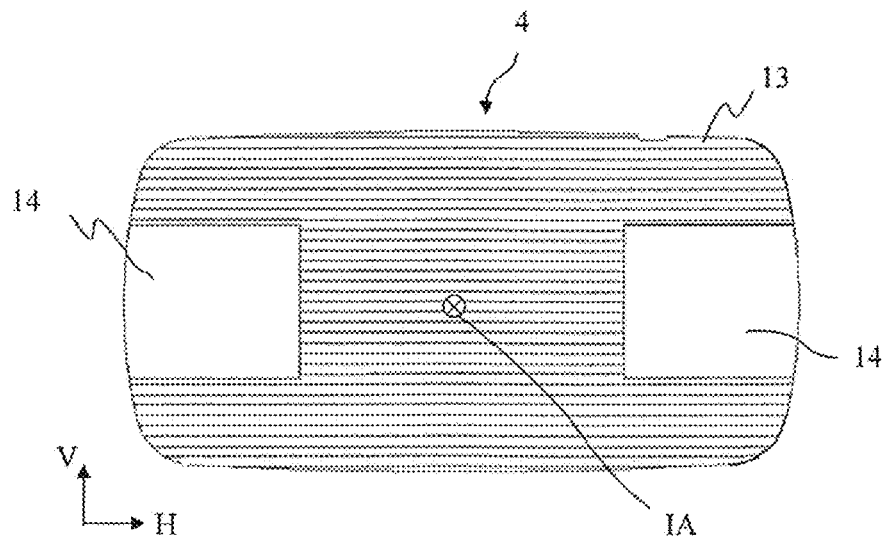
FIGS. 2A and 2B shows a light source side surface of a first light diffuser used in the illumination apparatus of the embodiment and an opposite-to-light source side surface thereof, respectively.
Figure 2B:
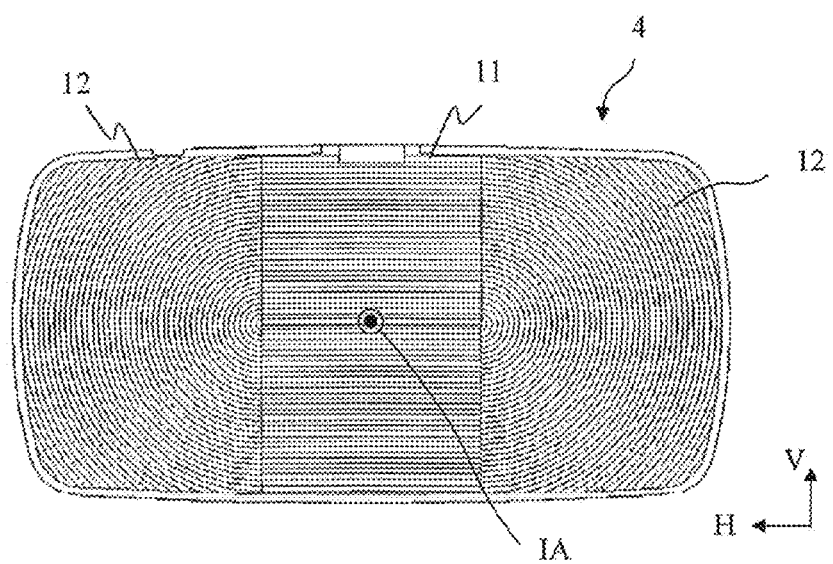

The flash 10 changes relative positions of the light source 1, the second reflector 2 and the light diffuser unit 3 fixed with respect to the first reflector 6 on an illumination axis IA to change its illumination angle that is an angular area where the illumination light emitted from the flash 1 is projected. The illumination axis IA is a virtual straight line passing through a radial center of the light source 1 and a vertical center of the light diffuser unit 3 as shown in FIGS. 1A and 1B. The illumination axis IA also passes through a horizontal (longitudinal) center of the light diffuser unit 3 as shown in FIGS. 2A and 2B and a horizontal center of the light source 1 though not shown. In this embodiment, the illumination axis IA passes through vertical and horizontal centers of the illumination angle. In the following description, a direction in which the illumination axis IA extend is referred to as "an illumination axis direction"

The first reflector 6 has, as a reflective surface, an inner surface formed in a horizontally long truncated pyramid shape. The light diffuser unit 3 is disposed so as to face a light exit side opening of the first reflector 6 (that is, so as to be located further on a light exit side than the first reflector 6). In a state shown in FIG. 1B, the first reflector 6 reflects light proceeding from the light source 1 or the second reflector 2 toward an outside of the light diffuser unit 3, toward the light diffuser unit 3 (that is, toward the light exit side).

The second reflector 2 has, as a reflective surface, an inner surface formed to be horizontally long and having a parabolic vertical sectional shape. In the sectional views of FIGS. 1A and 1B, a vertex of the parabolic vertical sectional shape of the second reflector 2 is disposed further on an opposite side to the light exit side than the light source 1 on the illumination axis IA. The second reflector 2 reflects light proceeding from the light source 1 toward the opposite side to the light exit side and toward the vertical direction, toward the light diffuser unit 3 (or toward the first reflector 6 in the state shown in FIG. 1B). The second reflector 2 and the light source 1 are movable with respect to the first reflector 6 and the light diffuser unit 3 by a movement mechanism (not shown) using an actuator such as a motor.

At the wide-angle end, as shown in FIG. 1A, the second reflector 2 is disposed inside the first reflector 6, and a light flux from the light source 1 is reflected by the second reflector 2 to exit from the reflector unit.

On the other hand, at the telephoto end at which the illumination angle is smaller than that at the wide-angle end, as shown in FIG. 1B, the first reflector 6 is disposed further on the light exit side than the second reflector 2, and the light flux from the light source 1 is reflected by at least one of the first and second reflector 2 to exit from the reflector unit.

In this embodiment, a distance $L_T$ on the illumination axis between the light source 1 and the second reflector 2 at the telephoto end is shorter than a distance $L_W$ on the illumination axis therebetween at the wide-angle end. Setting the distance between the light source 1 and the second reflector 2 relatively short at the telephoto end at which the illumination angle is smaller than that at the wide-angle end enables bright illumination for a limited illumination area corresponding to a long focal length of an image pickup lens with a high zoom ratio.

(Light Diffuser Unit)

Figure 3A:
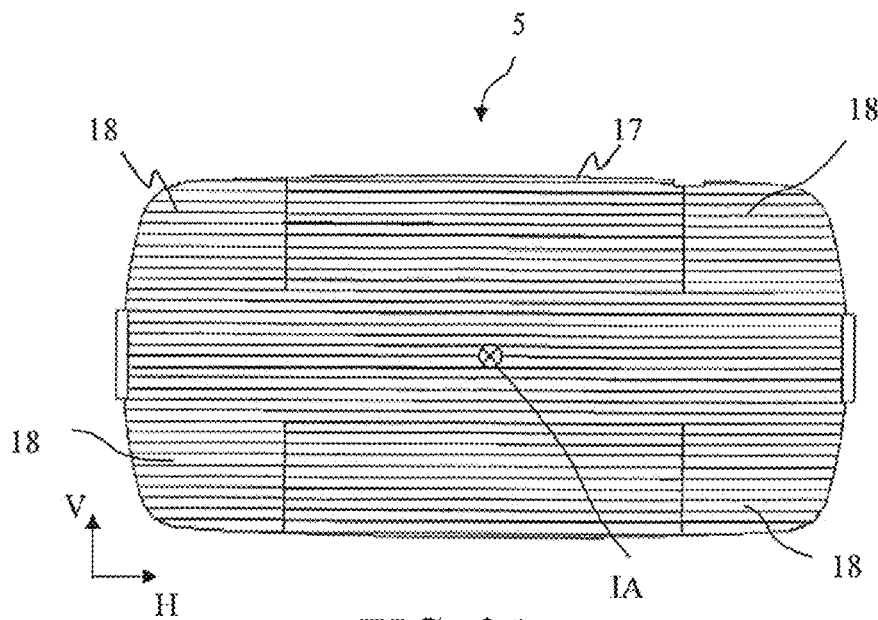
FIGS. 3A and 3B shows a light source side surface of a second light diffuser used in the illumination apparatus of the embodiment and an opposite-to-light source side surface thereof, respectively.
Figure 3B:
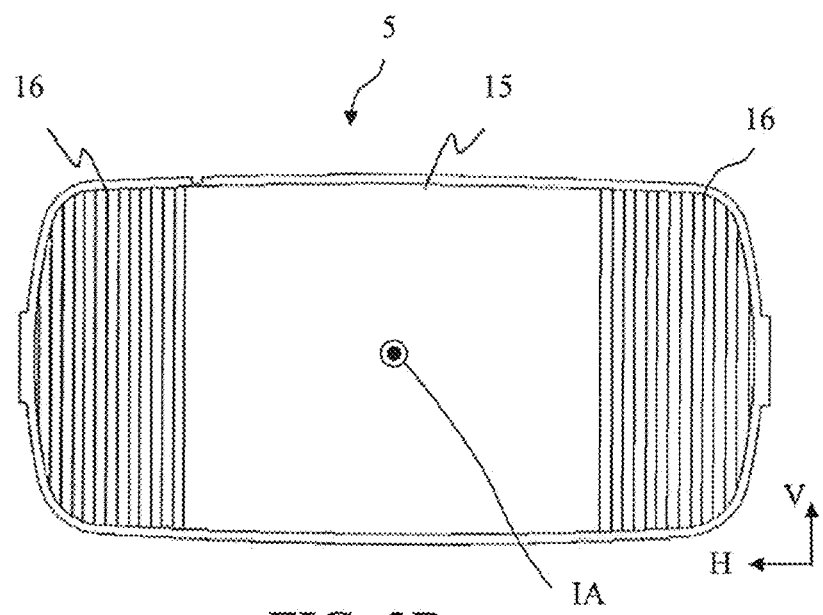

The light diffuser unit 3 is constituted by a first light diffuser 4 disposed on a light source side and a second light diffuser 5 disposed on an opposite side to the light source side (that is, on the light exit side). The light diffuser unit 3 has a function of diffusing light at least in the vertical direction (corresponding to a first direction) in a normal use state of the image pickup apparatus shown in FIG. 5. FIGS. 2A and 2B show a light source side surface of the first light diffuser 4 and a surface on an opposite side to the light source side (hereinafter referred to as "an opposite-to-light source side surface") thereof, respectively. FIGS. 3A and 3B show a light source side surface of the second light diffuser 5 and an opposite-to-light source side surface thereof, respectively.

The light source side surface of the first light diffuser 4 is provided with planar surfaces 14 formed in its peripheral parts in a longitudinal direction in which the line light source 1 extends (corresponding to a second direction and hereinafter referred to as "the horizontal direction") and with a first light diffusing portion 13 formed in part other than the planar surfaces 14. The first light diffusing portion 13 is constituted by a plurality of concave cylindrical lenses 19. As shown by a sectional view in FIG. 4A, each of the concave cylindrical lenses 19 extends in the horizontal direction, and the concave cylindrical lenses 19 are arranged in the vertical direction orthogonal to the horizontal and illumination axis directions so as to provide a light diffusing effect in the vertical direction. This light diffusing effect enables reduction (suppression) of the unevenness of the illumination light.

Such unevenness of illumination light (light distribution unevenness) that can be suppressed by the flash 10 of this embodiment cannot be suppressed by conventional flashes. For example, the flash disclosed in Japanese Patent Laid-Open No. 09-138449 generates light distribution unevenness due to light rays reflected by a seam portion of the movable reflector and the fixed reflector at unexpected reflection angles. The flash disclosed in Japanese Patent Laid-Open No.2005-043688 generates light distribution unevenness in which upper and lower high intensity illumination areas separately exist and a central dark area exists therebetween.

The opposite-to-light source side surface of the first light diffuser 4 is provided with a first light collecting portion 11 in its central part in the horizontal direction and with second light collecting portions 12 in its peripheral parts in the horizontal direction. The first light collecting portion 11 is constituted by a plurality of convex prisms 21. As shown by a sectional view in FIG. 4C, each of the convex prisms 21 extends in the horizontal direction and has a triangular vertical sectional shape, and the convex prisms are arranged in the vertical direction so as to provide a light collecting effect in the vertical direction. The second light collecting portions 12 are each constituted by a semicircular Fresnel lens having concentric arc lens surfaces. The second light collecting portions 12 are provided on both sides of the first light collecting portion 11 and provide a light collecting effect of collecting light inward in their radial direction (that is, toward the illumination axis).

The light source side surface of the second light diffuser 5 is provided with a second light diffusing portion 17 formed in its central part and with third light collecting portions 18 at its four corner parts. The second light diffusing portions 17 are each constituted by a plurality of concave cylindrical lenses 20. As shown by a sectional view in FIG. 4B, each of the concave cylindrical lenses 20 extends in the horizontal direction, and the concave cylindrical lenses 20 are arranged in the vertical direction so as to provide a light diffusing effect in the vertical direction. This light diffusing effect also enables reduction (suppression) of the unevenness of the illumination light. The third light collecting portions 18 are each constituted by a plurality of convex cylindrical lenses providing a light collecting effect in the vertical direction.

Moreover, as shown in FIG. 3B, the opposite-to-light source side surface of the second light diffuser 5 is provided with a planar surface 15 formed in its central part in the horizontal direction and with fourth light collecting portions 16 formed in its peripheral parts in the horizontal direction. The fourth light collecting portions 16 are each constituted by a plurality of convex cylindrical lenses. Each of the convex cylindrical lenses extends in the vertical direction, and the convex cylindrical lenses are arranged in the horizontal direction so as to provide a light collecting effect in the horizontal direction.

When $R_1$ represents a curvature radius of each concave cylindrical lens 19 formed in the first light diffusing portion 13 (shown in FIGS. 2A and 4A) of the first light diffuser 4, $L_W$ represents the above-mentioned distance on the illumination axis between the light source 1 and the second reflector 2 when the illumination angle is its maximum angle (wide-angle end), $L_T$ represents the above-mentioned distance on the illumination axis between the light source 1 and the second reflector 2 when the illumination angle is its minimum angle (telephoto end), the following condition (1) is satisfied:

$$0.2 < \frac{|L_T - L_W|}{R_1} < 5 \quad (1)$$

A value of $|L_T-L_W|/R_1$ below the lower limit of the condition (1) makes the light diffusing effect of the first light diffusing portion 13 insufficient, which causes the light distribution unevenness to remain. On the other hand, a value of $|L_T-L_W|/R_1$ beyond the upper limit of the condition (1) makes the light diffusing effect of the first light diffusing portion 13 excessively strong, which decreases a guide number on the telephoto side. In other words, in order to reduce the light distribution unevenness and provide a sufficient guide number, it is desirable to satisfy the condition (1).

Moreover, when $R_2$ represents a curvature radius of each concave cylindrical lens 20 formed in the second light diffusing portion 17 (shown in FIGS. 3A and 4B) of the second light diffuser 5, the following condition (2) is satisfied:

$$0.2 < \frac{|L_T - L_W|}{R_2} < 5 \quad (2)$$

A value of $|L_T-L_W|/R_2$ below the lower limit of the condition (2) makes the light diffusing effect of the second light diffusing portion 17 insufficient, which causes the light distribution unevenness to remain. On the other hand, a value of $|L_T-L_W|/R_2$ beyond the upper limit of the condition (2) makes the light diffusing effect of the second light diffusing portion 17 excessively strong, which decreases the guide number on the telephoto side. In other words, in order to reduce the light distribution unevenness and provide a sufficient guide number, it is desirable to satisfy the condition (2).

(Modified Example)

Although the above embodiment described the flash 10 in which the second reflector 2 is moved with respect to the first reflector 6 and the light diffuser unit 3, other configurations may be employed. For example, the first reflector 6 and the light diffuser unit 3 may be integrally moved with respect to the second reflector 2. Moreover, the first reflector 6 and the second reflector 2 may be moved by mutually different movement amounts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-146653, filed Jun. 29, 2012, which is hereby incorporated by reference herein in its entirety.

What is claimed is:

1. An illumination apparatus comprising:
   a light source; and
   a reflector unit to reflect a light flux from the light source, wherein the reflector unit comprises a first reflector and a second reflector whose relative positions on an illumination axis are changeable to change an illumination angle of the illumination apparatus,
   wherein, when the illumination angle is a first illumination angle, the second reflector is disposed inside the first reflector, and the light flux entering the reflector unit from the light source is reflected by the second reflector to exit from the reflector unit,
   wherein, when the illumination angle is a second illumination angle smaller than the first illumination angle, the first reflector is disposed further on a light exit side than the second reflector, and the light flux entering the reflector unit from the light source is reflected by at least one of the first and second reflectors to exit from the reflector unit, and
   wherein a distance on the illumination axis between the light source and the second reflector when the illumination angle is the second illumination angle is shorter than that when the illumination angle is the first illumination angle.

2. An illumination apparatus according to claim 1, further comprising a light diffuser unit disposed further on the light exit side than the reflector unit,
   wherein the light source is a line light source, and the light diffuser unit provides a light diffusing effect in a first direction orthogonal to a second direction in which the line light source extends and orthogonal to a direction in which the illumination axis extends.

3. An illumination apparatus according to claim 2, wherein the light diffuser unit comprises a first light diffuser, and
   wherein the first light diffuser is provided with, in its light source side surface, a first light diffusing portion providing a light diffusing effect in the first direction and with, in its opposite side surface to the light source side surface, a first light collecting portion providing a light collecting effect in the first direction and a second light collecting portion providing a light collecting effect in a direction toward the illumination axis.

4. An illumination apparatus according to claim 3, wherein the light diffuser unit further comprises a second light diffuser disposed further on the light exit side than the first light diffuser,
   wherein the second light diffuser is provided with, in its light source side surface, a third light collecting portion providing a light collecting effect in the first direction and a second light diffusing portion providing a light diffusing effect in the first direction and with, in its opposite side surface to the light source side surface, a fourth light collecting portion providing a light collecting effect in the second direction.

5. An illumination apparatus according to claim 4, wherein the first and second light diffusing portions are each formed by a plurality of concave cylindrical lenses, and
   wherein the first light diffusing portion satisfies the following condition:

$$0.2 < \frac{|L_T - L_W|}{R_1} < 5,$$

and the second light diffusing portion satisfies the following condition:

$$0.2 < \frac{|L_T - L_W|}{R_2} < 5$$

where $L_W$ represents a distance on the illumination axis between the light source and the second reflector when the illumination angle is its maximum angle, $L_T$ represents a distance on the illumination axis between the light source and the second reflector when the illumination angle is its minimum angle, $R_1$ represents a curvature radius of each of the concave cylindrical lenses of the first light diffusing portion, and $R_2$ represents a curvature radius of each of the concave cylindrical lenses of the second light diffusing portion.

6. An image pickup apparatus comprising:
   an illumination apparatus, and
   an image sensor to capture an object illuminated with light from the illumination apparatus,
   wherein the illumination apparatus comprises:
   a light source; and
   a reflector unit to reflect a light flux from the light source,
   wherein the reflector unit comprises a first reflector and a second reflector whose relative positions on an illumination axis are changeable to change an illumination angle of the illumination apparatus,
   wherein, when the illumination angle is a first illumination angle, the second reflector is disposed inside the first reflector, and the light flux entering the reflector unit from the light source is reflected by the second reflector to exit from the reflector unit,
   wherein, when the illumination angle is a second illumination angle smaller than the first illumination angle, the first reflector is disposed further on a light exit side than the second reflector, and the light flux entering the reflector unit from the light source is reflected by at least one of the first and second reflectors to exit from the reflector unit, and
   wherein a distance on the illumination axis between the light source and the second reflector when the illumination angle is the second illumination angle is shorter than that when the illumination angle is the first illumination angle.

* * * * *